Sept. 7, 1965  M. H. WENNING  3,204,754
UNLOADING CONVEYOR ARRANGEMENTS
Filed Sept. 16, 1963  2 Sheets-Sheet 1
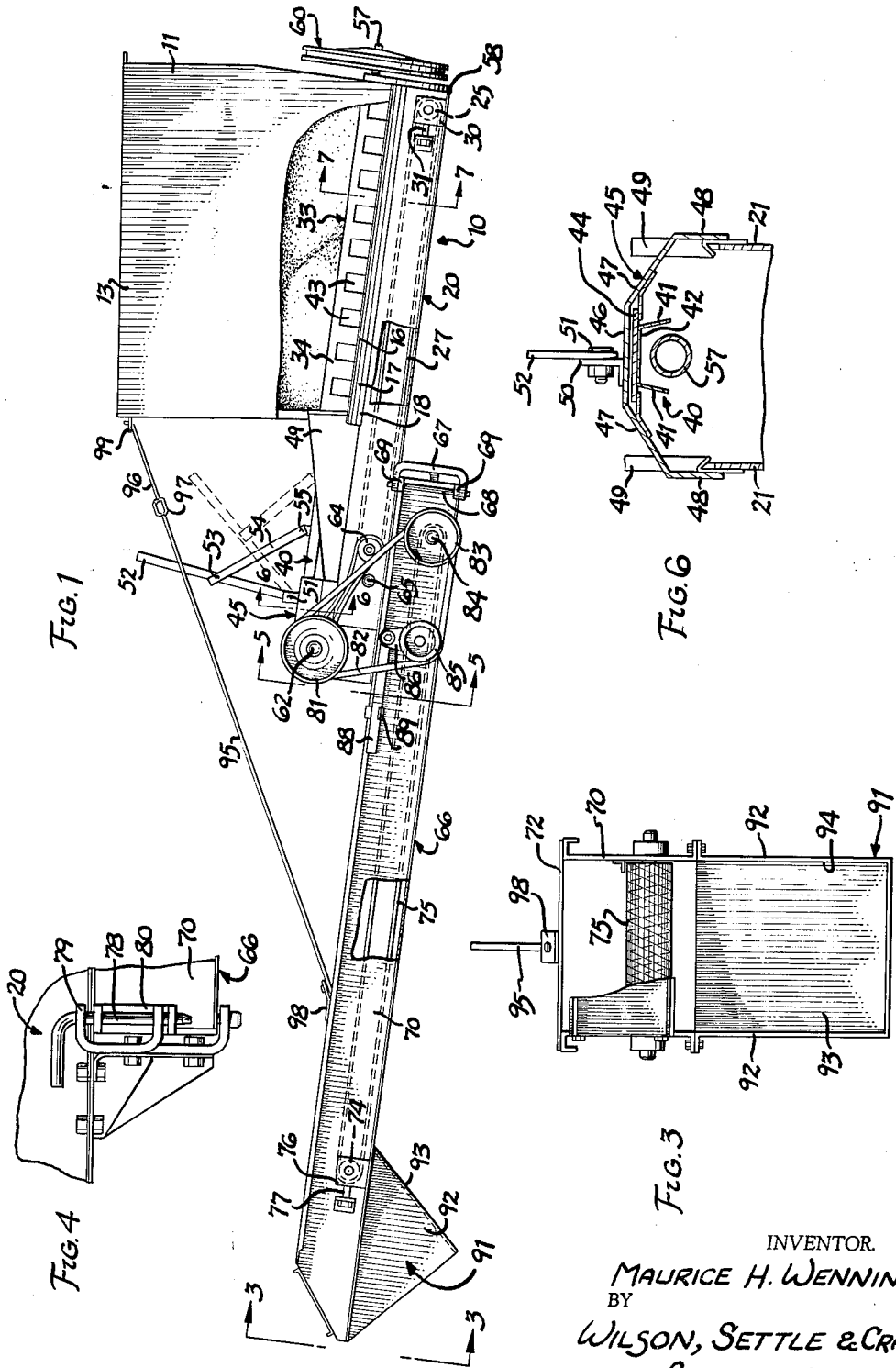
INVENTOR.
MAURICE H. WENNING
BY
WILSON, SETTLE & CRAIG
ATTORNEYS

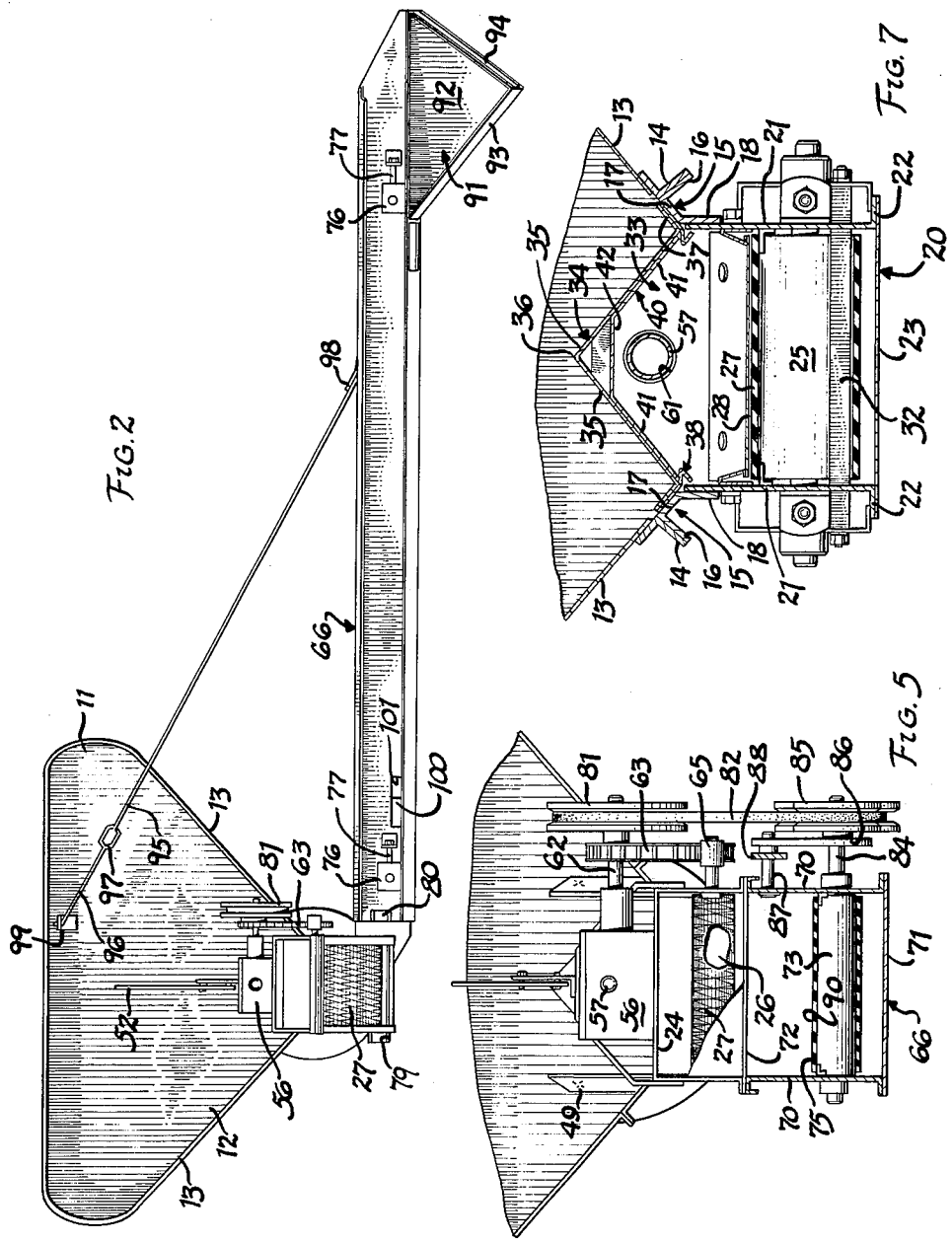

3,204,754
UNLOADING CONVEYOR ARRANGEMENTS
Maurice H. Wenning, Moline, Ill., assignor to J. I. Case Company, Racine, Wis., a corporation of Wisconsin
Filed Sept. 16, 1963, Ser. No. 308,974
9 Claims. (Cl. 198—102)

The present invention relates to an unloading conveyor arrangement for a combine storage bin or the like. More particularly, this invention relates to such an unloading arrangement which can be utilized to adapt a conventional multipurpose combine to the harvesting of fragile edible or seed crops, such as seed beans.

In a conventional multipurpose combine, the harvested crop, such as grain, is conveyed to a grain bin normally located in an elevated position and serving to temporarily store a quantity of grain until such time as the bin contents are transferred to a truck or wagon. Typically, this transfer is effected by an unloading auger traversing the interior of the bin at the bottom thereof and extending therefrom through an inclined discharge tube projecting laterally beyond the side of the combine to overhang the receiving truck or wagon. The auger is driven, usually by belt and sheave drive from a location on the opposite side of the bin from the side at which the auger discharges.

In the harvesting of normal grain crops, the utilization of such a grain bin unloading auger is quite satisfactory, even though the auger is somewhat harsh to the grain during unloading, due to the friction between the auger and the surrounding discharge tube. However, in the harvesting of fragile edible or seed crops, it has been found that utilization of such a conventional auger discharge arrangement can be disastrous. For example, in the harvesting of seed beans, the discharge auger inevitably results in the generation of sufficient frictional forces, caused by inherent slippage between the auger and the tube, to crack or split a large portion of the seed beans being discharged. Since the slightest degree of cracking or splitting of the seed beans causes a failure of such beans to germinate, a large percentage of the normally harvested crop is useless as seed.

The present invention now proposes the replacement of the conventional, above described auger with an unloading conveyor arrangement of novel type, which handles the crop much more gently and which, in the case of edible seed beans, eliminates any loss in the crop due to cracking of the beans during unloading.

More specifically, the present invention proposes the removal of the unloading auger and discharge tube, and its replacement with a plurality of overlapping endless conveyor belts. The belts are so disposed that the conventional belt and sheave drive arrangement can be utilized and are so located with respect to the grain bin that the discharge occurs substantially at the same location into an awaiting truck or wagon. Further, the endless belt conveyor arrangement is designed in such a manner that the plurality of belts can be relatively pivotally moved to an inoperative position to reduce the over-all width of the combine during storage or during those periods at which unloading is not necessary.

Basically, the unloading arrangement of the present invention includes a first endless belt conveyor which traverses the bottom of the grain bin to convey the bin contents to a position external of the bin, and a second endless belt conveyor underlying the discharge end of the first conveyor and serving to convey the bin contents to the desired remote discharge location. The two belts are supported so as to be relatively pivotally movable from a first discharge position, at which the belts are longitudinally aligned with their ends overlapping, and a second misaligned position, at which the second of the belts is misaligned with the first of the belts to reduce the over-all width of the combine. A novel and unique driving arrangement is utilized for the two belts, this drive arrangement including an angular drive unit, such as a 90 degree bevel gear drive, located substantially at the point of overlapping of the belts, and receiving power by means of a drive shaft traversing the bin in order that the conventional drive sheave and belt may be utilized.

The output shaft of the angular drive unit drives the two belts through separate driving elements, the driving element for the second of the conveyors being removable in order to accommodate relative pivotal movement of the conveyors.

By the utilization of the pair of conveyor belts, there is no such inherent slippage and no such inevitable scuffing and cracking as occurs in the conventional auger and tube drive and, as a result, fragile edible or seed crops can be discharged from the grain bin without damage and without loss of germination.

It is, therefore, an important object of the present invention to provide a new and novel unloading conveyor arrangement for a combine storage bin or the like, capable of handling fragile edible or seed crops.

Another important object is the provision of an unloading conveyor arrangement for a combine storage bin or the like, utilizing a pair of separate conveyor belts which are pivotally interconnected for relative movement to a first aligned discharge position, at which the belts overlap one another to form a continuous discharge path, and to a second misaligned position, at which the belts are angularly related in an inoperative storage condition to reduce the over-all width of the combine.

It is a further important object of this invention to provide an unloading conveyor arrangement for a combine storage bin for replacing a conventional auger-and-tube unloading arrangement with a plurality of endless conveyor belts driven from the conventional driving mechanism which is located remotely with respect to at least one of the belts.

Yet another, and no less important, object of the present invention is the provision of a pair of overlapping endless conveyor belts, one of the belts projecting into a combine storage bin for receiving the contents thereof, and the other of the belts being located exteriorly of the bin to convey the removed contents to a desired discharge location, the belts each being driven from a common, angular drive unit which is located interiorly of the storage bins and which receives power from a drive shaft traversing the bin.

Other and further objects of this invention will appear in the following description and appended claims, reference being had to the accompanying drawings forming a part of this specification wherein like reference characters designate corresponding parts in the several views.

On the drawings:

FIGURE 1 is a side elevational view of an unloading conveyor arrangement of the present invention, the arrangement being illustrated in its normal or operative position;

FIGURE 2 is an end elevational view of the unloading conveyor arrangement, the mechanism being illustrated in an inoperative or folded storage condition;

FIGURE 3 is an end elevation view of a portion of the present invention, this view being taken in the direction of directional arrows 3—3 of FIGURE 1;

FIGURE 4 is a fragmentary side elevational view, illustrating a locking mechanism for retaining the conveyor arrangement in its operative condition of FIGURE 1;

FIGURE 5 is an enlarged, fragmentary sectional view taken along the plane 5—5 of FIGURE 1;

FIGURE 6 is an enlarged fragmentary sectional view taken along the plane 6—6 of FIGURE 1; and FIGURE 7 is a fragmentary sectional view taken along the plane 7—7 of FIGURE 1.

As shown on the drawings:

In FIGURE 1, reference numeral 10 refers generally to a unloading conveyor arrangement for combine storage bin or the like, and including a storage bin 11 adapted to be mounted in an elevated position upon a self-propelled combine or the like. For clarity of illustration, the bin mounting arrangement and the combine upon which the bin is mounted have been deleted from the drawings.

From FIGURES 1 and 2, it will be noted that the combine storage bin 11 is of a generally triangular transverse shape, the bin being defined by triangular end walls 12 and downwardly and inwardly converging side walls 13. These side walls 13 are reinforced at their free lower edges by angle irons 14. The out-turned legs of these angle irons 14 are in full surface abutment with formed reinforcing members 15 having out-turned legs 16, intermediate portions 17 longitudinally aligned with the bin side walls 13 and down-turned end projections 18 defining therebetween a bottom bin opening in full and free communication with the interior of the bin.

Closing this opening between the depending legs 18 is an unloading conveyor housing, indicated generally at 20. This housing 20 is of a size and shape to replace the normal auger-type unloader for the bin 11, and the housing includes a pair of side plates 21 secured at their upper ends to the legs 18 and provided at their lower ends with out-turned marginal flanges 22, to receive thereagainst a lower closure plate 23.

It will be noted from FIGURE 1 that the opening in the bottom of the bin 11 (defined by the members 15) is inclined from the horizontal, and the housing 20 is similarly inclined by its attachment to the inclined projections 18. Further, as illustrated in FIGURE 1, the housing 20 projects longitudinally beyond the confines of the bin, that portion of the housing projecting beyond the bin being provided with an upper closure wall 24, as best illustrated in FIGURE 5 of the drawings.

Located in longitudinally spaced relation within the housing are a pair of guide rolls 25 and 26 wrapped by an endless conveyor belt 27, the belt having an upper conveying surface 28 underlying the bin and communicating with the bin interior through the open bin bottom. The rolls 25 and 26 are adjustable relative to one another, e.g., the roll 25 being journaled in a bearing slide 30 carried by the housing side walls 21 and adjustable longitudinally by an adjustment screw 31 to maintain the desired tension in the belt 27. The roll 26 is similarly supported (by means not shown). To prevent the accumulation of grain on the inside of the belt where it may be crushed as the belt 27 passes about the roll 25, a scraper 32 is disposed interiorly of the belt loop, the scraper being of V-shaped configuration and projecting laterally beyond the side walls 21 of the housing.

Located within the confines of the bin 11 is a shutter mechanism, indicated generally at 33, for regulating the fall of the bin contents onto the uper conveying surface 28 of the belt 27. More particularly, the shutter arrangement comprises an upper first shutter element 34 having angularly related side walls 35 joining to one another at an apex, as at 36, and culminating at their outer ends in upturned flanges 37, overlying the formed securing means 15. Interposed between the flanged ends 37 of the shutter element 34 and the formed retaining members 15 are elongated side guide elements, indicated generally at 38, and projecting inwardly to underlie the shutter mechanism. The guides 38, the flanges 37 and the flanged members 15 are generally secured together by suitable means, as by spot welding. Nested in the shutter element 34 is a shutter slide, indicated generally by reference numeral 40, and comprising side wall portions 41, in flatwise abutting contact with the undersurface of the shutter element 34, the sidewall portions 41 being joined by a horizontal bridging portion 42.

The longitudinal lower edges of the shutter slide side walls 41 are in sliding contact with the upper surface of the guide elements 38 so that the shutter slide 40 is supported for longitudinally displaceable sliding movement relative to the fixed shutter member 34. As best illustrated in FIGURE 1 of the drawings, the fixed shutter member 34 and the shutter slide 40 are each provided with longitudinally spaced, generally rectangular apertures 43, and the apertures and spacing therebetween for the two elements 34 and 40 being identical.

Upon movement of the shutter slide 40, the apertures in the shutter slide 40 may be moved into varying degrees of registry with the apertures in the fixed shutter member 34, these degrees of registry ranging from complete registery (at which the complete extent of the apertures is exposed) to complete non-registry (at which the apertures are, in effect, closed). Thus, it will be seen that longitudinal displacement of the shutter slide 40 will vary the rate of feeding of the bin contents from the storage bin 11 into the housing 20 and onto the upper conveying surface 28 of the conveyor belt 27.

As best illustrated in FIGURE 6 of the drawings, the shutter slide 40 projects longitudinally beyond the confines of the fixed shutter element 34. Since the projecting portion of the shutter slide 40 serves no feed-controlling function, the side walls 41 thereof are foreshortened, and a relatively heavy actuating plate 44 is secured to the upper surface of the bridging portion 42. This actuating plate 44 closely underlies a sheet metal housing designated generally at 45 (FIGURE 6), the housing 45 having a planar upper surface 46 joined through downwardly and outwardly inclined joining portions 47 to vertically depending terminal legs 48 which are spot-welded, or otherwise secured, to a pair of channel braces 49 projecting from the housing side walls 21 to the bin end walls 12 (FIGURE 5).

Superimposed on the upper wall 46 of the sheet metal housing 45 is an angle bracket 50 to which is pivotally secured, as by a pivot bolt 51, an actuating handle 52. Medially of the handle 52 is pivotally secured, as at 53, an actuating arm 54, which actuating arm is, in turn, pivotally connected at 55 to the actuating plate 44. Actuation of the handle 52 from its solid line position of FIGURE 1 to its dotted line position of FIGURE 1, will displace the entire shutter slide 40 to the right, thereby opening the ports 43.

As above explained, the exposed end of the housing 20 is provided with a top wall 24 rearwardly of the sheet metal housing 45. Upon this wall 24 is superimposed an angular drive mechanism 56. This angular drive mechanism preferably is a right angle bevel gear set, although other belt-drive or chain-drive angular drive units may be utilized, if desired.

Power input into the angular drive unit 56 is obtained by means of an input shaft 57 which traverses the interior of the bin 11 beneath the apex 36 of the shutter mechanism 33. More particularly, the input drive shaft 57 is journaled at one end in a journal plate 58 secured to one side wall 12 of the bin, and that portion of the drive shaft projecting beyond the one side wall 12 is provided with a drive sheave 60.

This drive sheave 60 is positioned relative to the bin 11 and the remainder of the combine or other machine on which the bin is located in the same relative position as the normal unload auger-drive sheave.

The shaft 57 then projects through the shutter assembly 33 to a position exterior of the bin 11, the bin side wall 12 being apertured, as at 61, to accommodate the passage of the shaft therethrough. The shaft projects beneath the slide 41 of the sheet metal housing 45 into the angular drive unit 56 to impart driving motion to the angular drive unit 56.

The angular drive unit output shaft 62 is provided with a sprocket lapped by a drive chain 63, the chain also lapping a drive sprocket 64 for driving the drive roll 26 for the belt 27. An idler roll 65 is provided for the drive chain 63 to insure tautness.

Pivotally connected to the conveyor housing 20 is a second conveyor unit indicated generally at 66, this pivotal connection including a C-shaped pivot bracket 67 secured to the housing 20 and depending therebeneath to carry a vertical pivot pin 68. This pin 68 also traverses pivot arms 69 secured to and projecting laterally beyond one of the side plates 70 of the second conveyor housing 66.

As illustrated in FIGURE 5, the second conveyor housing 66 comprises the channel side plates 70 joined to a bottom plate 71, and further joined to a top plate 72, the side plates 70 journaling therebetween a pair of guide rolls 73, 74, lapped by a second conveyer belt 75, the guide rolls 73 and 74 being carried in bearing brackets 76 (FIGURE 2) provided with adjusting screws 77 for maintaining the belt taut.

As above explained, the first housing 20 carries the second housing 70 for pivotal movement about the pivot pin 66 and, in FIGURE 4, there is illustrated a latching mechanism for securing the housings in longitudinal alignment, as illustrated in FIGURE 1. This latching mechanism includes a latching pin having a vertical lower section 78 projecting through apertures formed in interleafed, bifurcated brackets 79 and 80, respectively, secured to the first housing 20 and the second housing 66.

The output shaft 62 of the angular drive unit 56 also carries a drive sheave 81 lapped by a flexible drive belt 82 extending about a driven sheave 83 mounted on the shaft 84 of the guide roll 73. The belt 82 also extends about an idler sheave 85 carried by a pivot arm 86, depending from a pivot shaft 87 carried by the adjacent side wall 70 of the second housing 66 and provided with an elongated actuating handle 88 normally located in a retaining clip 89 also carried by the side wall 70.

The structure of the idler sheave 85 and its actuating arm 88 is such that removal of the arm 88 from the retaining clip 89 and counterrotational movement thereof will pivot the idler sheave 85 in a similar counterclockwise direction around the pivot shaft 87, thereby, in effect, lessening the distance between the drive sheave 81, the driven sheave 83 and the idler sheave 85, so that the belt 82 may be readily removed from its illustrated position.

It will, of course, be understood that the portion of the second conveyor housing 66 underlying the first conveyor housing 20 is open at its top so that material from the conveying surface 28 of the first belt 27 will be free to drop from the first belt as the first belt traverses the discharge roller 26, to deposit the material upon the upper conveying surface 90 of the second belt 75. The advancement of the second belt to the left (as illustrated in FIGURE 1) will ultimately discharge the material from the belt as the belt passes about the second roller 74, the material then passing through a discharge guide 91 comprising side sheets 92 and a bottom sheet 93 providing a discharge opening 94.

A stabilizer strut is provided by a pair of elongated, longitudinally aligned rods 95, 96 interconnected by a central turnbuckle 97, the rod 95 being secured, as by a bracket 98, to the second conveyer housing 66, and the rod 96 being interconnected to the bin end wall 12, as by a bracket 99.

A scraper 100 is provided within the loop of the conveyor belt 75 immediately in advance of the roll 73, as best shown in FIGURE 2. Any grain on the upper surface of the lower reach of the belt 75 is deflected by the scraper through the aperture 101 to prevent crushing of the grain as the belt passes about the roll 73.

Summary

From the foregoing description of the grain bin unloading arrangement of the present invention it will be appreciated that the present invention provides basically a means for converting from a conventional auger-type discharge for a grain bin to a belt-type conveyor discharge, capable of jointly handling fragile crops, such as seed beans and the like.

Although the specific mounting of the grain bin 11 upon the combine has not been shown, it will be appreciated that the bin is positioned in the conventional position, generally superimposed over the threshing components of the combine. In the case of a self-propelled combine, the bin is positioned above the threshing component and immediately behind the operator's position so that the handle 52 can be easily manually adjusted to its two positions of FIGURE 1, thereby controlling the flow of the crop from the bin 11 through the shutter mechanism 33.

It will be noted that the positioning of the sheave 60 is such that the conventional delivery auger drive can be utilized, this utilization of the sheave 60 being made possible by the passage of the drive shaft through the shutter mechanism to the remotely located angular drive unit 56. Thus, a conventional combine, supplied with a conventional auger unloading mechanism, can be readily converted to the unloading mechanism of the present invention.

The slope of the conveyor belts 27, 75 is about fifteen degrees from the horizontal in order that discharge through the discharge guide 91 and the opening 94 can be operated at the proper height for unloading into a truck or wagon. The utilization of the belts 27, 75, having a roughened or contoured surface, stabilizes the first few layers of the crop, such as beans, on the belt and prevents any slippage of the crop on the belt. Thus, no harmful abrasions and loss of germination ability can occur.

The belt 27 can be driven at a relatively high speed, e.g., on the order of 255 feet per minute, and the belt 75 is driven at a somewhat higher speed, e.g., on the order of 296 feet per minute. This difference in speed is provided in order to prevent overloading of the belt 75 at the area of discharge of the crop, i.e., at the point where the belt 27 discharges onto the belt 75.

The overlapping of the belts so that the discharge end of the belt 27 overlies the input end of the belt 75 insures the complete transfer of the crop to the second belt and also substantially simplifies the design of the drive for the two belts. The utilization of a single output shaft 62 from the angular drive unit 56 to drive the belt 27 through the chain 63 and the sprocket 64, and to drive the lower belt 75 through the belt 82 and the sheave 83 affords a compact and simple drive with the relative speeds of the belts being readily correlated through sheave and sprocket size adjustments.

Further, the use of the flexible belt 82 for driving the conveyor belt 75 affords a readily removable power transmission arrangement accommodating folding of the second conveyor mechanism to its inoperative position of FIGURE 2, thereby accommodating the same function as is normally performed by the folding of the outer end of the unloading auger. The scrapers 32, 100 for the belts 27, 75, respectively, removes any grain which might accumulate on the inside of the belts before any such grain can be carried into the conveyor roller. Thus, any possibility of friction loss due to crushed grain is prevented.

While one exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In an unloading conveyor arrangement for a combine storage bin or the like, said bin having an elongated gravity discharge slot therein, means defining a first endless belt conveyor having an upper conveying surface adapted to receive material from said discharge slot and effective to deliver such material to a location external to said bin, means defining a second endless belt conveyor having an upper conveying surface adapted to receive material discharged from said first conveyor and to convey such material to a remote discharge position, means pivotally interconnecting said conveyors and accommodating movement of said second conveyor to an angularly related position at which the second conveyor is inoperative, and a common drive means for said first and second conveyors and including a single angular drive unit located at substantially the region of overlap of the two conveyors, said drive unit having an input shaft projecting from said drive unit through the bin for connection to a prime mover, said drive unit also having an output shaft, and means connecting said conveyors to said output shaft only when said conveyors are in their driving, overlapped relation.

2. In an unloading conveyor arrangement for a combine storage bin or the like having a bottom opening, a first endless conveyor belt, a pair of spaced guide rolls supporting said first belt to define an upper conveying belt reach, one of said guide rolls underlying said bin opening and the other of said guide rolls being located externally of said bin, a second endless conveyor belt, a second pair of spaced guide rolls supporting said second belt to define an upper conveying surface, one of said second guide rolls generally underlying said other of the guide rolls for said first belt and the other of said second guide rolls being located in spaced relation to said one of said second guide rolls so that said second belt projects beyond said first belt to a normal delivery location, and a common drive shaft from which said other of the guide rolls for said first belt and said one of said second guide rolls are driven to advance said belts, respectively, in an unloaing direction relative to said storage bin.

3. In an unloading conveyor arrangement for a combine storage bin or the like, said bin having an elongated gravity discharge slot therein, a first endless conveyor means including a first belt and a pair of spaced drive rolls supporting said first belt to define a first upper conveying surface adapted to receive material from said discharge slot and effective to deliver such material to a location external to said bin, a second endless conveyor means including a second belt and a pair of spaced drive rolls supporting said second belt to define a second upper conveying surface adapted to receive material discharged from said first belt surface and to convey such material to a remote discharge position, means pivotally interconnecting said first and second conveyor means and accommodating movement of said second conveyor means to an angularly related position at which the second conveyor is inoperative, and a common drive means for said first and second conveyors and including a single angular drive unit located at substantially the region of overlap of the two conveyor means, an input shaft for said drive unit projecting from said drive unit through the bin for connection to a prime mover, said angular drive unit also having an output shaft, and means for independently connecting one drive roll of each of said conveyor means to said output shaft when said conveyors are in their overlapped relation.

4. In an unloading conveyor arrangement for a combine storage bin or the like, said bin having an elongated gravity discharge slot therein, a first conveyor housing secured to said bin and having an open-topped first portion underlying said slot and an open-bottomed second portion projecting there-beyond, a pair of guide rollers journaled in said first housing portions, respectively, a first endless conveyor belt lapping said rollers to define an upper conveying surface communicating through said slot and the open-topped first housing portion with said bin to receive material from said bin and delivering material for discharge through the open-bottomed second portion of said housing, a second conveyor housing interconnected to said first housing and having an open-topped first portion registering with the open-bottomed second portion of said first housing and having an outlet opening remote from said open-topped first portion thereof, a pair of spaced guide rollers journaled in said second housing, an endless conveyor belt lapping said rollers to define an upper conveying surface communicating through the open-topped first portion of said second housing with the second portion of said first housing to receive material discharged from said first belt, an apertured cover overlying said first housing first portion, a drive shaft projecting through said cover, means for driving said shaft from a location external to said bin and remote from said first housing second portion, a gear set carried by said second portion of said first housing externally of said bin and driven by said shaft, and driving connections from said gear set to that guide roller journaled in said first housing second portion to drive the first conveyor belt and to the adjacent roller journaled in said second housing to drive the second conveyor belt, respectively.

5. In an unloading conveyor arrangement for a combine storage bin or the like, said bin having an elongated gravity discharge slot therein, a conveyor housing secured to said bin and having an open-topped first portion underlying said slot and an open-bottomed second portion projecting therebeyond, a pair of guide rollers journaled in said housing portions, respectively, an endless conveyor belt lapping said rollers to define an upper conveying surface communicating through said slot and the open-topped first housing portion with said bin to receive material from said bin and delivering material for discharge through the open-bottomed second portion of said housing, an apertured cover overlying said housing first portion, a drive shaft projecting through said cover, means for driving said shaft from a location external to said bin and remote from said housing second portion, a gear set secured to said second portion of said housing externally of said bin and driven by said shaft, and a driving connection from said gear set to that guide roller journaled in said second housing portion to drive the conveyor belt.

6. In an unloading conveyor arrangement for a combine storage bin or the like having a bottom opening, first and second endless conveyor belts, means supporting said first belt so that a first portion thereof underlies said bin opening and a second portion thereof projects beyond the confines of said bin, means supporting said second belt in longitudinal alignment with said first belt, said second belt partially underlying said second portion of said first belt to receive material therefrom, and means for driving said belts at different speeds, said second belt being driven faster than said first belt.

7. In an unloading conveyor arrangement for a combine storage bin or the like, said bin having an elongated gravity discharge slot therein, means defining a pair of overlapping conveyors, said means including (1) a first endless belt having an upper conveying surface adapted to receive material from said discharge slot and effective to deliver such material to a location external to said bin and (2) a second endless belt having an upper conveying surface partially underlying said first belt to receive material discharged from said first belt and to convey such material to a remote discharge position, and a common drive mean for said first and second belts and including a single angular drive unit located at substantially the region of overlap of the two conveyors.

8. In an unloading conveyor arrangement for a combine storage bin or the like, said bin having an elongated gravity discharge slot therein, a first endless conveyor means including an elongated first housing secured fixedly to said bin, a first belt disposed in said housing and a pair of spaced drive rolls journaled in said first housing and supporting said first belt to define a first upper conveying surface adapted to receive material from said discharge slot and effective to deliver such material to a location external to said bin, a second endless conveyor means including a second housing, a second belt disposed in said housing and a pair of spaced drive rolls journaled in said second housing and supporting said second belt to define a second upper conveying surface adapted to receive material discharged from said first belt surface and to convey such material to a remote discharge position, and means pivotally interconnecting said first and second housings and accommodating movement of said second conveyor means to an angularly related position at which the second conveyor is inoperative.

9. In an unloading conveyor arrangement for a combine storage bin or the like, said bin having an elongated gravity discharge slot therein, a conveyor housing secured to said bin and having an open-topped first portion underlying said slot and an open-bottomed second portion projecting therebeyond, a pair of guide roller journaled in said housing portions, respectively, an endless conveyor belt lapping said rollers to define an upper conveying surface communicating through said slot and the open-topped first housing portion with said bin to receive material from said bin and delivering material for discharge through the open-bottomed second portion of said housing, an apertured cover overlying said housing first portion, a correspondingly apertured shutter disposed within said cover, means supporting said shutter for longitudinal displacement relative to said cover to move the cover and shutter apertures into and out of registry, a drive shaft projecting through said cover and said shutter, means for driving said shaft from a location external to said bin and remote from said housing second portion, a gear set secured to said second portion of said housing externally of said bin and driven by said shaft, a driving connection from said gear set to that guide roller journaled in said second housing portion to drive the conveyor belt, and manually adjustable means located externally of said bin for displacing said shutter.

References Cited by the Examiner

UNITED STATES PATENTS 1,446,124   2/23   Luhtenberg _____ 198—100 X

SAMUEL F. COLEMAN, *Primary Examiner.*

WILLIAM B. LA BORDE, *Examiner.*